Feb. 5, 1946.   L. YOST   2,394,283
SWITCH OPERATING MECHANISM
Filed March 27, 1943
Fig. 1.
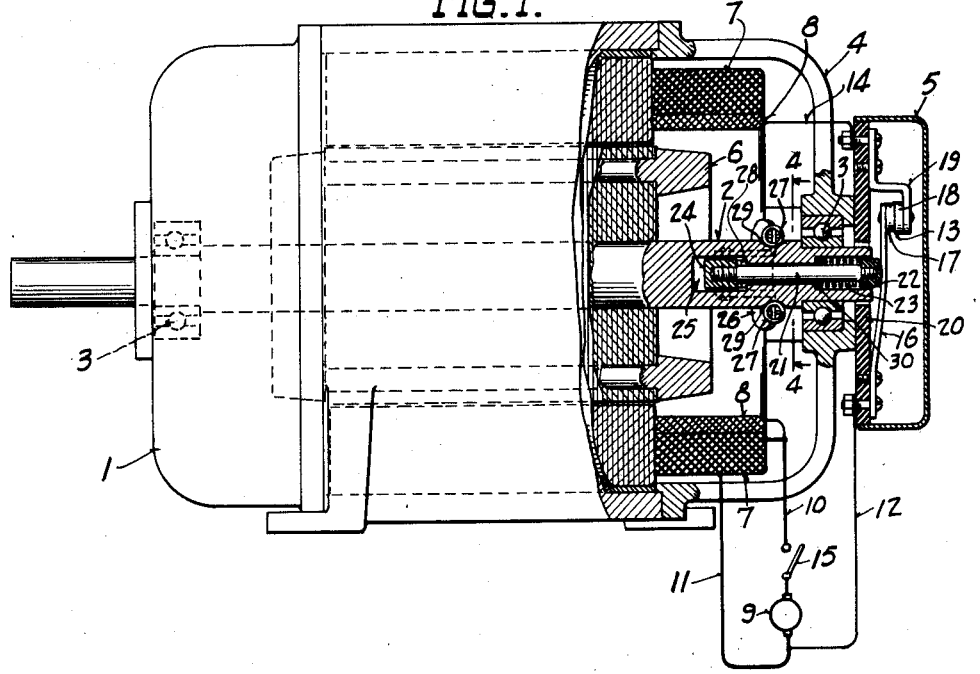
Fig. 2.
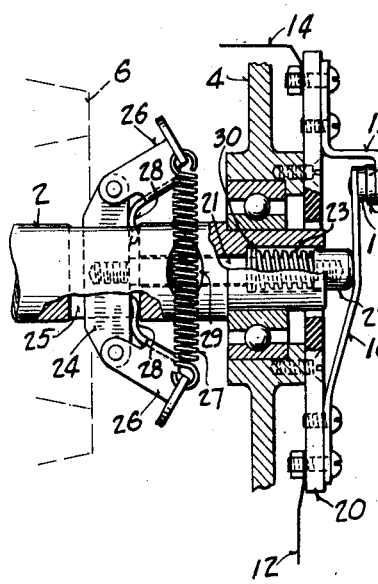
Fig. 3.
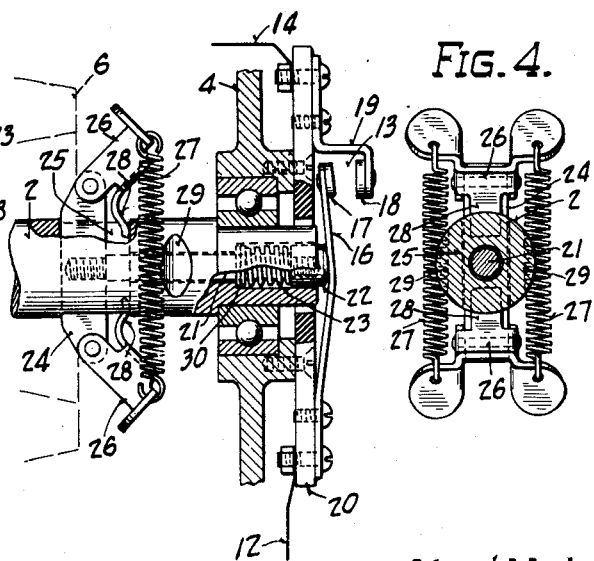
Fig. 4.
Lloyd Yost
INVENTOR.
BY Elwin A. Andrus
ATTORNEY.

Patented Feb. 5, 1946

2,394,283

UNITED STATES PATENT OFFICE 2,394,283

SWITCH OPERATING MECHANISM

Lloyd Yost, San Gabriel, Calif., assignor to A. O. Smith Corporation, Milwaukee, Wis., a corporation of New York Application March 27, 1943, Serial No. 480,785

5 Claims. (Cl. 200—80)

This invention relates to a switch operating mechanism of the kind employed to operate a switch in accordance with the speed of rotation of a member.

The principal object of the invention is to provide such a switch operating mechanism responsive to the speed of rotation of a shaft or other member and which will operate with greater certainty and less maintenance cost than switches heretofore employed.

The invention has been applied to the operation of switches for cutting out the starting winding on single phase induction motors.

The accompanying drawing illustrates an embodiment of the invention in a switch operating mechanism disposed at the end of a motor shaft.

In the drawing:

Figure 1 is a side elevation of a motor with the end of the housing and shaft broken away and sectioned showing the switch and the operating push rod therefor;

Fig. 2 is a side elevation of the centrifugal mechanism on the motor shaft for operating the push rod, the motor shaft being turned 90° from its position in Fig. 1;

Fig. 3 is a view similar to Fig. 2 showing the position of the parts when the shaft is rotating at motor speed and the switch open; and Fig. 4 is a transverse section through the shaft taken on line 4—4 of Fig. 1 and showing the mechanism.

As illustrated, the motor 1 has an armature shaft 2 rotating in suitable bearings 3 in a housing 4. One end of the shaft terminates adjacent the outer end of a bearing 3 and inside a switch housing 5 secured to the end of housing 4.

The rotor 6 of the motor is of squirrel cage construction and is secured to the shaft 2. The stator comprises a main coil 7 and a starting coil 8. The main coil 7 is connected to a source of power 9 through leads 10 and 11. The starting coil 8 is also connected to one terminal of the source of power 9 through lead 10 and to the other terminal by lead 12, switch 13 and lead 14. A switch 15 is placed in the common lead 10 to permit manual starting or stopping of the motor.

Switch 13 comprises a spring arm 16 provided with a contact 17 which is arranged to engage a contact 18 on a fixed bracket 19. The spring arm 16 and the bracket 19 are secured to a panel 20, of any suitable insulating material such as Bakelite, fixed to the end of housing 4.

The spring arm 16 is biased to withdraw contact 17 from contact 18.

When the motor is not operating or when the rotor has not attained a speed sufficient to provide the proper torque in the main stator winding 7, the switch 13 is held closed by a push rod 21 disposed axially in the end of shaft 2.

The head 22 of push rod 21 is disposed in a central recess in the shaft and is biased outwardly against arm 16 by a spring 23 in said recess. The head 22 and preferably the entire push rod 21 is constructed of good electrical insulating material such as some type of Bakelite or resin.

The inner end of push rod 21 is threaded or otherwise secured in a transverse bar 24 extending through the shaft 2 in a slot 25 in the shaft. The bar 24 has approximately the same thickness as the smaller dimension of slot 25, while the larger dimension of slot 25 is considerably greater than the width of the bar 24. This provides for reciprocation of the bar 24 in slot 25 axially of the shaft 2.

The bar 24 extends to a considerably greater diameter than the shaft 2 and carries at its outer ends a pair of centrifugal weighted arms 26 pivotally attached thereto in a manner to rotate therewith. The position of arms 26 is governed by the speed of rotation of shaft 2 tending to swing them outwardly away from one another and by the tension springs 27 which have their corresponding ends secured to the respective arms 26.

The arms 26 carry inwardly extending lever arms 28 which extend into slots 25 adjacent the bar 24 and tend to move the latter axially of shaft 2 corresponding to the radial position of the arms 25. Movement of bar 24 toward rotor 6 pulls the push rod 21 inwardly against spring 23 and releases the spring arm 16 of the switch 13 to break the engagement between contacts 17 and 18.

In order to obtain the desired snap action for the switch 13, each spring 27 normally follows a groove 29 on the opposite sides of shaft 2. When, under the impelling centrifugal force of rotation, the outward pivotal movement of arms 26 tends to pull the springs sufficiently toward the rotor 6, the springs 27 snap out of grooves 29 and move axially of the shaft. When the motor stops the springs 27 snap back into the grooves 29.

When the motor is not running or has not attained a predetermined speed, the springs 27 hold the arms 26 inwardly and the bar 24 forwardly thereby cooperating with spring 23 in biasing head 22 of push rod 21 against the switch arm 16 and maintains the switch 13 in closed position. The spring 23 may be omitted when the location of grooves 29 relative to the slot 25 and operating parts effects a return of the springs 27 to the grooves 29 upon stopping of the motor.

Closing of the manual switch 15 to start the motor effects energizing of starting windings 7 and 8. As the motor gains speed the centrifugal weighted arms 26 tend to move outwardly against the tension of springs 27 until the latter are suddenly snapped out of the respective grooves 29, at which time the lever arms 28 effect movement of bar 24 and pull rod 21 inwardly against the pressure of spring 23 and release the switch arm 16. The spring arm 16 is biased to separate contact 17 from contact 18 as soon as released and to thereby open the switch 13 and disconnect the starting winding 8 from the source of power for the duration of the operation of the motor.

When the motor is stopped the centrifugal action of arms 26 becomes weaker until springs 27 snap back into groves 29 and spring 23 pushes rod 21 outwardly to close the switch 13 ready for another starting operation.

The design of the parts and selection of springs should be made with care to obtain the operation of switch 13 at the desired speed of rotation of the motor shaft. An adjustment can be made by removing the housing 5 and switch arm 16 to give access to push rod 21. The push rod is also removable and by inserting or removing one or more washers 30 of predetermined thickness in the recess containing spring 23 in shaft 2, the biasing strength of the spring 23 can be changed as desired. Different strength springs 27 may be employed, depending upon the speed of rotation at which the snap action of the mechanism is to occur.

Various embodiments of the invention may be made within the scope of the accompanying claims.

The invention is claimed as follows:

1. In a control mechanism of the class described, a rotatable shaft, a control member reciprocable axially in said shaft and fixed to rotate therewith, means biasing said member axially in one direction, a transverse bar secured to said member and extending through a slot in said shaft, and centrifugally operated means for moving said bar and member axially of the shaft against said biasing means.

2. In a control mechanism of the class described, a rotatable shaft, a control member reciprocable axially in said shaft and fixed to rotate therewith, a transverse bar secured to said member and extending through a slot in said shaft, centrifugally separated means for moving said bar and member axially of the shaft in one direction, and resilient means opposing the movement of said member by said first named means.

3. In a control mechanism of the class described, a rotatable shaft, a control member reciprocable axially in said shaft, means biasing said member axially in one direction, a transverse bar secured to said member and extending through a slot in said shaft, and a centrifugally weighted lever arm pivotally secured to each end of said bar and engaging an abutment on the shaft to move said bar and member axially of the shaft against said biasing means.

4. In a control mechanism of the class described, a rotatable shaft, a control member reciprocable axially in said shaft, means biasing said member axially in one direction, a transverse bar secured to said member and extending through a slot in said shaft, a centrifugally weighted lever arm pivotally secured to each end of said bar and engaging an abutment on the shaft to move said bar and member axially of the shaft against said biasing means, and means biasing said lever arms against centrifugal action to effect operation of the mechanism at a predetermined speed of rotation of the shaft.

5. In a control mechanism of the class described, a rotatable shaft, a control member reciprocable axially in said shaft, a transverse bar secured to said member and extending through a slot in said shaft, a centrifugally weighted lever arm pivotally secured to each end of said bar and engaging an abutment on the shaft to move said bar and member axially of the shaft in one direction, and means biasing said lever arms against centrifugal action to effect operation of the mechanism at a predetermined speed of rotation of the shaft and biasing said member in a direction opposite to its movement under said centrifugal arms.

LLOYD YOST.